(12) United States Patent
Scheirer et al.

(10) Patent No.: US 7,427,385 B2
(45) Date of Patent: Sep. 23, 2008

(54) SYSTEMS AND PROCESSES FOR REDUCING THE SULFUR CONTENT OF HYDROCARBON STREAMS

(75) Inventors: Glen E. Scheirer, South Riding, VA (US); Francis S. Wu, The Woodlands, TX (US); Thomas R. Kiliany, La Palma, CA (US)

(73) Assignee: ExxonMobil Research and Engineering Company, Annandale, NJ (US)

(*) Notice: Subject to any disclaimer, the term of this patent is extended or adjusted under 35 U.S.C. 154(b) by 456 days.

(21) Appl. No.: 11/016,263

(22) Filed: Dec. 17, 2004

(65) Prior Publication Data

US 2006/0131216 A1 Jun. 22, 2006

(51) Int. Cl.
*C01B 3/24* (2006.01)
*C01B 3/26* (2006.01)
*B01D 53/48* (2006.01)

(52) U.S. Cl. ............... 423/244.01; 423/244.02; 423/244.06; 423/244.07; 423/244.08; 423/244.09; 423/244.1; 423/650; 423/652

(58) Field of Classification Search .......... 423/244.01, 423/244.02, 244.06, 244.07, 244.08, 244.09, 423/244.1, 650, 652
See application file for complete search history.

(56) References Cited

U.S. PATENT DOCUMENTS

| | | | | |
|---|---|---|---|---|
| 3,058,800 | A | | 10/1962 | Frevel et al. ............ 23/2 |
| 4,088,736 | A | | 5/1978 | Courty et al. ............ 423/230 |
| 4,491,516 | A | | 1/1985 | Polleck et al. ............ 208/248 |
| 4,511,668 | A | | 4/1985 | Nozue et al. ............ 502/84 |
| 4,735,788 | A | | 4/1988 | Voirin ............ 423/244 |
| 4,977,123 | A | * | 12/1990 | Flytzani-Stephanopoulos et al. |
| 5,514,351 | A | * | 5/1996 | Buchanan et al. |
| 5,674,463 | A | * | 10/1997 | Dao et al. |
| 5,853,681 | A | * | 12/1998 | Denny et al. |
| 5,942,201 | A | * | 8/1999 | Hartmann |
| 6,030,597 | A | * | 2/2000 | Buchanan et al. |
| 6,042,798 | A | * | 3/2000 | Masuda et al. |
| 6,610,264 | B1 | * | 8/2003 | Buchanan et al. |
| 6,743,405 | B1 | * | 6/2004 | Siriwardane |

(Continued)

FOREIGN PATENT DOCUMENTS

EP 0195534 9/1986

(Continued)

*Primary Examiner*—Wayne Langel
(74) *Attorney, Agent, or Firm*—Malcolm D. Keen; Lawrence E. Carter

(57) ABSTRACT

Systems and processes for removing a first sulfur compound from a hydrocarbon stream. The systems and process utilize at least one reaction vessel incorporating a hydrolysis catalyst suitable for hydrolyzing the first sulfur compound to a second sulfur compound. The reaction vessel also incorporates a sorbent material suitable for absorbing the second sulfur compound. Following hydrolysis of the first sulfur compound to the second sulfur compound and absorption of the second sulfur compound, a hydrocarbon-containing stream having a reduced sulfur content is produced. The hydrolysis catalyst and sorbent material may be provided in separate zones within the reaction vessel or provided as a mixture in a single zone. The hydrocarbon-containing stream having a reduced sulfur content is suitable for a variety of uses, including as a feedstreams for hydrogen plants, process gas streams for power generation plants, or for other uses for hydrocarbon-containing stream having reduced sulfur content.

14 Claims, 2 Drawing Sheets

U.S. PATENT DOCUMENTS

| | | | |
|---|---|---|---|
| 6,905,592 B2 * | 6/2005 | Bence et al. | |
| 6,942,841 B2 * | 9/2005 | Kanno et al. | |
| 6,942,842 B2 * | 9/2005 | Breuer et al. | 423/244.01 |
| 7,060,233 B1 * | 6/2006 | Srinivas et al. | |
| 7,074,375 B2 * | 7/2006 | Lampert et al. | |
| 2002/0159939 A1 | 10/2002 | Lieftink et al. | 423/242.1 |
| 2002/0182134 A1 * | 12/2002 | Wu et al. | 423/239.1 |

FOREIGN PATENT DOCUMENTS

| | | |
|---|---|---|
| EP | 0218153 | 4/1987 |
| EP | 0 952 111 | 10/1999 |
| GB | 1 332 337 | 3/1973 |
| WO | 03011436 | 2/2003 |
| WO | 2004033367 | 4/2004 |

* cited by examiner

SYSTEMS AND PROCESSES FOR REDUCING THE SULFUR CONTENT OF HYDROCARBON STREAMS

FIELD OF THE DISCLOSURE

This disclosure relates to systems and processes for reducing the sulfur content of hydrocarbon-containing streams.

BACKGROUND INFORMATION

Sulfur compounds, including carbonyl sulfide ("COS") and carbon disulfide ("$CS_2$"), are typically found in streams derived from gas resources containing carbon dioxide and hydrogen sulfide ("$H_2S$"). The sulfur compounds may be created from $CO_2$ and $H_2S$ in refinery processes. Also, the sulfur compounds may be naturally occurring in gas streams produced from reservoirs containing significant quantities of $CO_2$ and $H_2S$.

In various uses for such hydrocarbon streams, existence of the sulfur compounds may have significant detrimental effects. For example, if the hydrocarbon-containing streams are used as feeds for reformers to produce hydrogen-containing streams, the sulfur compounds may "poison" the reforming catalysts. Although the hydrocarbon-containing streams may be scrubbed to remove the $CO_2$ and $H_2S$, the scrubbing processes will not remove all of the sulfur compounds, particularly COS and $CS_2$.

Several known methods may be used to remove COS from the hydrocarbon-containing streams. For example, the COS may be removed by scrubbing with a physical solvent in processes such as the Rectisol® process or scrubbing with a chemical solvents such as diglycol amine ("DGA"). Alternatively, the COS may be removed by absorption onto solid sorbents such as in a Pressure Swing Adsorption ("PSA") unit. Still other COS removal methods include hydrogenating with hydrogen over a base metal catalyst such as CoMoly and hydrolyzing with water over various specialty catalysts such as catalysts sold under the designations G-41P and C53-2-01 available from Sud Chemie and Puraspec 2312 available from Synetix. All of these known processes are expensive alternatives for removing COS form hydrocarbon-containing streams.

Other processes for removing COS from hydrocarbon-containing streams are known. For example, U.S. Patent Application 2002/0159939 discloses systems for removing odorants and sulfur compounds from gas streams. The systems may include the steps of contacting the stream with a COS hydrolysis catalyst to convert $H_2S$ followed by contacting the gas with a material to remove the $H_2S$. Titania, zirconia, thoria, lanthanide oxide, alumina, ceria, molybdenum oxide, vanadium oxide, manganese oxide, cobalt oxide, iron oxide, and nickel oxide are disclosed as a catalyst for hydrolyzing the COS. Zeolites are disclosed as suitable materials for removing the $H_2S$. U.S. Pat. No. 4,735,788 discloses a process for reduction of COS and carbon disulfide compounds in a gas stream containing water vapor through hydrolysis. The catalyst may be titanium dioxide.

PCT Application WO 2004/033367 discloses a variety of processes for removing carbonyl sulfide and carbon disulfide compounds from feeds for hydrogen generators. The processes generally involve a hydrolysis step in which the sulfur compounds are converted to $H_2S$. The processes may also include the use of two solid sorbent beds for removing the sulfur compounds and the hydrogen sulfide. Suitable hydrolysis catalysts are identified as including alumina, zirconia, and titania. Suitable sorbents for removing the $H_2S$ are zinc oxide and iron oxide. PCT Application WO 03/011436 discloses a process for removing COS from a stream. The stream is passed through a fixed bed containing both a COS hydrolysis catalyst and a hydrogen sulfide absorbent. The application identifies activated alumina as a suitable hydrolysis catalyst. Suitable $H_2S$ absorbents are identified as copper and/or zinc oxides, hydroxides, carbonates, or hydroxycarbonates.

BRIEF DESCRIPTION OF THE DISCLOSURE

This disclosure relates to systems and processes for removing at least one sulfur compound from a hydrocarbon-containing stream. The systems and processes incorporate at least one reaction vessel incorporating a hydrolysis catalyst suitable for hydrolyzing a first sulfur compound, such as COS or $CS_2$, to a second sulfur compound, $H_2S$. Exemplary useful hydrolysis catalysts are activated alumina, titania, titanium dioxide, and mixtures thereof. The reaction vessel also includes a sorbent material selected from zinc oxide, copper oxide, hydroxides, carbonates, hydroxycarbonates, and mixtures thereof for absorbing the second sulfur compound. The hydrocarbon-containing stream is directed sequentially to separate layers, within the reaction vessel, of the hydrolysis and the sorbent material or to at least one layer containing a mixture of the hydrolysis catalyst and sorbent material.

Following hydrolysis of the first sulfur compound to the second sulfur compound and absorption of the second sulfur compound, a hydrocarbon-containing stream having a reduced sulfur content is produced. In one embodiment, the systems and processes described herein are used to produce substantially sulfur-free hydrocarbon streams. For purposes of this disclosure, "substantially sulfur free" streams means streams containing less than 0.1 ppm total sulfur. In certain embodiments, the systems and processes described herein may incorporate more than one vessel incorporating the hydrolysis catalyst and sorbent material as described above. Generally, the greater the number of such vessels implemented, the more complete the removal of the sulfur compounds.

Both the hydrolysis catalysts and the sorbent materials described above are relatively inexpensive. Therefore, following the useful lives of the hydrolysis catalyst and the sorbent material, both may be disposed of as waste. The systems and processes also enable removal of sulfur compounds from hydrocarbon-containing streams without the need for a separate hydrolysis reactor as typically utilized in conventional systems.

The hydrocarbon-containing streams having reduced sulfur contents produced in accordance with the systems and processes described herein are suitable for a variety of uses, including uses as a feedstreams for hydrogen plants, process gas streams for power generation plants, or for other uses for hydrocarbon-containing stream having reduced sulfur content.

DETAILED DISCLOSURE

This disclosure relates to systems and processes for removing at least one sulfur compound from a hydrocarbon-containing stream. The systems and processes incorporate a hydrolysis catalyst suitable for hydrolyzing a first sulfur compound to a second sulfur compound. The vessel also includes a sorbent material selected from zinc oxide, copper oxide, hydroxides, carbonates, hydroxycarbonates, and mixtures thereof, suitable for absorbing the second sulfur compound.

In exemplary embodiments, the first sulfur compound is selected from the group consisting of COS, $CS_2$, and mixtures thereof. These sulfur compounds are frequently found in hydrocarbon-containing streams. In the processes and systems described herein, the hydrocarbon-containing stream is directed to the hydrolysis catalyst and sorbent material in reaction vessel to reduce the sulfur content of the hydrocarbon-containing stream. When the first sulfur compound contacts the hydrolysis catalyst in the presence of water, it is hydrolyzed to a second sulfur compound. In exemplary embodiments, the second compound is $H_2S$. Hydrolysis of COS and $CS_2$ takes place in accordance with the following equations:

$$COS + H_2O \rightarrow H_2S + CO_2 \quad (1)$$

$$CS_2 + 2 H_2O \rightarrow 2 H_2S + CO_2 \quad (2)$$

Following hydrolysis of the first sulfur compound to the second sulfur compound, the second sulfur compound is absorbed by the sorbent material to yield a hydrocarbon-containing stream having a reduced sulfur content.

Figure 1:
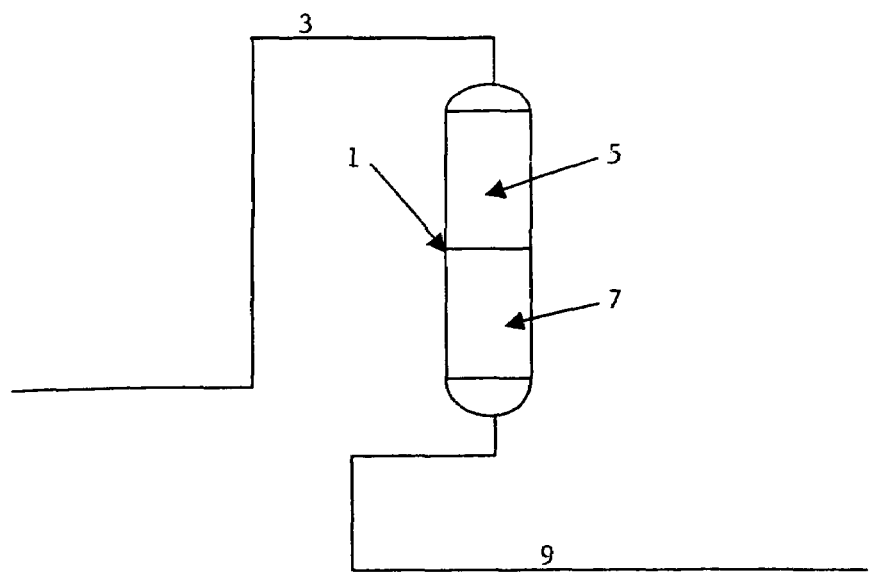
FIG. 1 is a schematic representation of an embodiment of the systems and processes described herein incorporating a single vessel with separate layers of a hydrolysis catalyst and sorbent material.

FIG. 1 provides a schematic representation of an embodiment of the systems and processes described herein. In this embodiment, the hydrolysis catalyst and sorbent material are provided in separate sequential beds in the same reaction vessel. However, it is understood that the details provide below are applicable to embodiments in which the hydrolysis catalyst and sorbent material are provided mixed into same fixed bed. Vessel 1 may be any suitable vessel capable of functioning as a fixed bed reactor. A hydrocarbon-containing stream 3 is directed to the vessel 1. The hydrocarbon stream 3 may be any of a variety of hydrocarbon streams useful as a source of hydrogen or fuel. Exemplary streams are hydrocarbon-containing streams such as natural gas streams and refinery fuel gas streams. The stream 3 may contain from about 0.5 volume parts per million ("vppm") to about 1 volume percent of the first sulfur compound. In one embodiment, the stream 3 contains from about 5 vppm to about 1,000 vppm of the first sulfur compound. In another embodiment, stream 3 contains from about 5 vppm to about 20 vppm of the first sulfur compound.

Once the hydrocarbon-containing stream enters vessel 1, it is directed to a first section 5 of vessel 1. First section 5 contains at least one hydrolysis catalyst. A variety of hydrolysis catalysts are suitable. In certain embodiments, the hydrolysis catalyst is selected to be a relatively inexpensive catalyst to maximize the economic efficiency of the systems and processes described herein. If such catalysts are used, it is economically feasible to dispose of the hydrolysis catalyst as waste, once it is spent, as opposed to using a more expensive catalyst that may economically dictate regeneration of the catalyst. Exemplary suitable hydrolysis catalysts are alumina, titania, titanium dioxide, zirconia, and mixtures thereof. In one embodiment, the hydrolysis catalyst is selected from alumina, titania, and mixtures thereof. In a specific embodiment, the catalyst is an activated alumina, commonly used in Claus-type processes. These Claus-type catalysts are commercially available from a variety of suppliers. A specific exemplary catalyst is commercially available under the designation "DD-431" from Alcoa.

The hydrolysis catalysts in section 5 may be provided in the form a fixed catalyst bed. The catalysts may be in the form of particles having surface areas over a wide range. In one embodiment, the surface area of the catalyst particles ranges from about 10 to about 500 square meters per gram ("BET"). In certain embodiments, the catalyst particles have a surface area of about 50 to about 400 square meters per gram ("BET"). In other embodiments, the catalyst particles have surface areas of about 100 to about 400 square meters per gram ("BET").

The catalyst bed may be held in place in through means used in conventional fixed catalyst beds. Typically, the fixed catalyst bed is held in place with a support grid or grating at the bottom of the reactor bed. In one embodiment, the catalyst particles are placed on top of a layer of an inert catalyst support material positioned on a wire screen above the grating. In certain embodiments, a layer of the inert support material may be positioned at the top of the catalyst bed. In certain embodiments, the inert catalyst support material may be provided in the form of spheres of various sizes.

Alumina and titania catalysts having high surface areas may be acidic. If the hydrocarbon-containing stream includes olefins, the acidity may promote undesired polymerization side reactions within the first section of the vessel. To minimize such side reactions, dopants, such as sodium and potassium oxides, may be applied to the catalyst bed to minimize the polymerization reactions. However, due to the difficulties in handling sodium and potassium oxides, the use of these in commercial operations is generally undesirable. Alternatively, cracking and polymerization may be minimized by adding water in the form of steam to the reaction vessel 1.

Various promoters such as iron, cobalt, nickel, copper, and zinc may also be added to the hydrolysis catalyst section 5 to increase the hydrolysis reaction rate.

The first section of vessel 1 containing the hydrolysis catalyst may be maintained at a temperature from about 250° C. to about 500° C. over a wide pressure range such as from atmospheric pressure (100 kPa) to about 10,000 kPa. In other embodiments, the first section is maintained at a temperature from about 300° C. to about 450° C. and a pressure of about 100 kPa to about 5,000 kPa. In still other embodiments, the first section is maintained at a temperature from about 350° C. to about 400° C. and a pressure of about 100 kPa to about 1,000 kPa.

In certain embodiments, the temperature and pressure of the reactor is maintained by controlling the temperature and pressure of the hydrocarbon-containing stream 3 directed to reactor 1 rather than directly controlling the conditions within the reactor. For example, the desired temperature of the stream 3 may be maintained by supplying heat to the stream prior to entry into the first section of vessel 1. Generally, the heat may be supplied by a heat exchanger (not shown) that supplies heat from other processes to stream 3. For example, in certain embodiments, the heat supplied by the heat exchanger may be derived from a waste stream from a hydrogen generator reformer or from a fuel cell waste stream.

To achieve satisfactory hydrolysis of the first sulfur compound, it is necessary to maintain an appropriate water concentration in the hydrocarbon-containing stream. In certain embodiments, the molar ratio of the water to the first sulfur compound in the hydrocarbon-containing stream ranges from about 1:1 to about 1000:1. In other embodiments, the molar ratio of water to first sulfur compound in the hydrocarbon-containing stream ranges from about 1:1 to about 10:1. In still other embodiments, the molar ratio of water to first sulfur compound in the hydrocarbon-containing stream ranges from about 2:1 to about 10:1.

Typically, the hydrocarbon-containing streams selected for use as stream 3, as identified above, will have water concentrations within these ranges. However, in the event the water concentration of stream 3 falls below the ranges set forth above, an optional water source (not shown) may be provided to supply water to stream 3 prior to entry into the first section of vessel 1. Alternatively, the optional water source may be used to provide water directly to the first section of vessel 1. However, it is generally more efficient to add water to the hydrocarbon-containing stream prior to contact with the hydrolysis catalyst.

The hydrocarbon-containing stream may be directed to the hydrolysis catalyst over a range of space velocities, which are, of course, dependent on the pressure drop across the first section 5 of the vessel. In one embodiment, the space velocity of the hydrocarbon-containing stream across the first section of the vessel ranges from about 10 to 6,000 hour$^{-1}$ (standard cubic feet per hour per cubic feet of catalyst). In other embodiments, the space velocity of the hydrocarbon-containing stream through the first section of the vessel ranges from about 1,000 to 5,000 hour$^{-1}$. In still other embodiments, the space velocity of the hydrocarbon-containing stream through the first section of the vessel ranges from about 3,000 to about 4,000 hour$^{-1}$.

Of course, generally, the highest conversion rates of the sulfur compound are the most desirable. It has been found that conversion rates of the first sulfur compounds to $H_2S$ in excess of 99% are attainable through the above described hydrolysis in the reactor vessel. In one embodiment, the first sulfur compound conversion rate to $H_2S$ in first section is from about 90% to greater than 99%. In other embodiments, the conversion rate ranges from about 95% to greater than 99%.

Referring to FIG. 1, after exiting the first section 5 of vessel 1 where the hydrolysis reaction takes place, the hydrocarbon-containing stream is directed to the second section 7 of vessel 1 which is in communication with the first section of the vessel 1. Within the second section 7, the hydrocarbon-containing stream is contacted with a sorbent material to remove at least a portion of the $H_2S$ resulting from the conversion of the first sulfur compound in the first section by absorption onto the sorbent. Exemplary suitable sorbents useful for inclusion in the second section of the vessel are zinc oxide, copper oxide, hydroxides, carbonates, hydroxycarbonates, and mixtures thereof. The sorbent may be provided in any convenient shapes such as pellets or monoliths having a variety of sizes. For example, extrudates of 5 mm in diameter with lengths between 7 mm to 15 mm may be used. Zinc oxide particles in this form are commercially available from Harshaw Chemical Co. under the product designation: Harshaw ZN-0401 E 3/16. Generally, the sorbent materials will absorb greater amounts of $H_2S$ the higher the temperature maintained in the second section of the vessel. The sorbent material may be provided in the form of a fixed bed of the type described in connection with the fixed bed for the hydrolysis catalyst.

Generally, the temperature, pressure, and space velocity in the second section 7 of the vessel is dependent on the pressure of the stream as it exits the first section 5 of the vessel.

After contact with the sorbent material in the second section 7 of vessel 1, the hydrocarbon-containing stream 9 is removed from the vessel and directed to further processing or use as may be appropriate. The hydrocarbon-containing stream 9 exiting the vessel may have a first sulfur compound content of less than 1 vppm in one embodiment. In another embodiment, the hydrocarbon-containing stream 9 exiting the vessel may have a first sulfur compound content of less than 0.5 vppm. In still other embodiments, the hydrocarbon-containing stream 9 exiting the vessel may have a first sulfur compound content of less than 0.1 vppm.

In the systems and processes disclosed, both the hydrolysis catalyst and the hydrocarbon are relatively inexpensive. Therefore, following the useful lives of the hydrolysis catalyst and the sorbent, both may be disposed of as waste. When spent, the hydrolysis catalysts and the sorbents materials may be removed for disposal.

Figure 2:
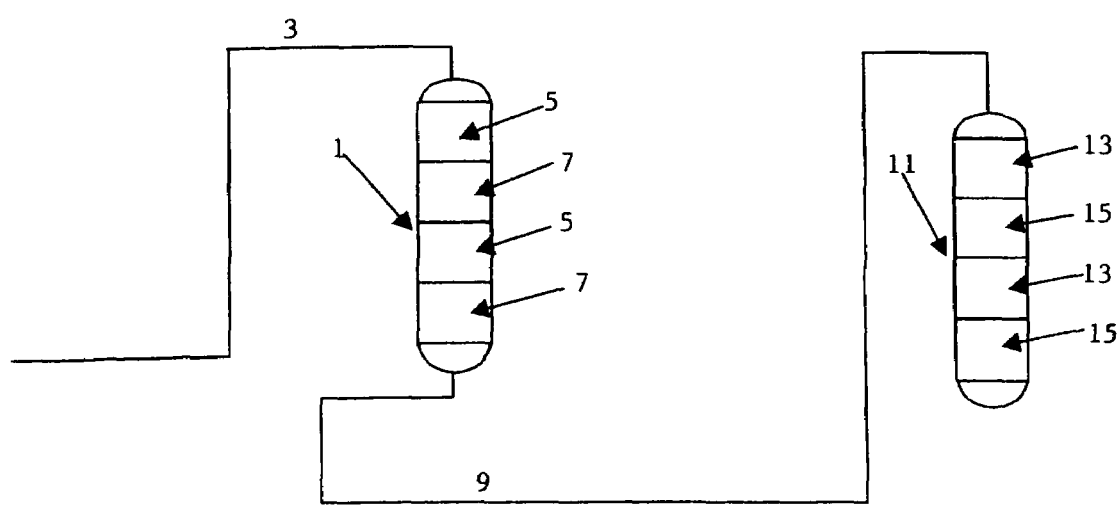
FIG. 2 is schematic representation of an embodiment of the systems and processes described herein incorporating multiple vessels with separate layers of a hydrolysis catalyst and sorbent material.

FIG. 2 depicts another embodiment of systems and processes described here. In this embodiment, the systems and processes incorporate two vessels, each having two hydrolysis catalyst layers and two sorbent material layers. The first vessel 1, the components thereof, and the streams entering and exiting vessel 1 are provided with the same numerical designations as used in FIG. 1. These elements may be the same as described in connection with FIG. 1. The difference in FIG. 2 being the existence of two hydrolysis catalyst beds 5 and two sorbent material beds 7 as opposed to the existence of one bed of each type in FIG. 1. Additionally, the hydrocarbon streams and the temperatures, pressures, and other conditions within vessel 1 may be the same as described in connection with FIG. 1. In the embodiment depicted in FIG. 2, after contact with the sorbent material in the second sorbent material bed 7 of vessel 1, the hydrocarbon-containing stream 9 is directed to a second vessel 11 that also contains two hydrolysis catalyst beds 13 and two sorbent material beds 15. As with the first vessel 1, the hydrocarbon-containing stream is routed sequentially through the various beds of alternating hydrolysis catalyst beds 13 to hydrolyze at least a portion of the first sulfur compound remaining in hydrocarbon stream after treatment in the first vessel to $H_2S$ and then remove at least a portion of the $H_2S$ by contact with sorbent material in alternating sorbent material beds 15 of vessel 11.

The various components in the second vessel 11 may be of the types described in connection with vessel 1 of FIG. 1. Moreover, the conditions vessel 11 may be within the ranges described in connection with vessel 1 of FIG. 1.

In addition to sequential operation of the reaction vessels 1 and 11 of FIG. 2 as described, the vessels 1 and 11 may be arranged to operate in a lead-lag configuration to allow in which each vessel may be operated independently of the other. Such a configuration allows for one vessel to remain operational while the other vessel is non-operational. This may be particularly useful when it is necessary change the catalyst and sorbent materials of one of the vessels.

It is understood that although the vessels depicted in FIG. 2 have two catalyst beds and two sorbent beds, in other embodiments, the vessels may have any number of beds of each type or one or more beds incorporating a mixture of a hydrolysis catalyst and a sorbent material.

Figure 3:
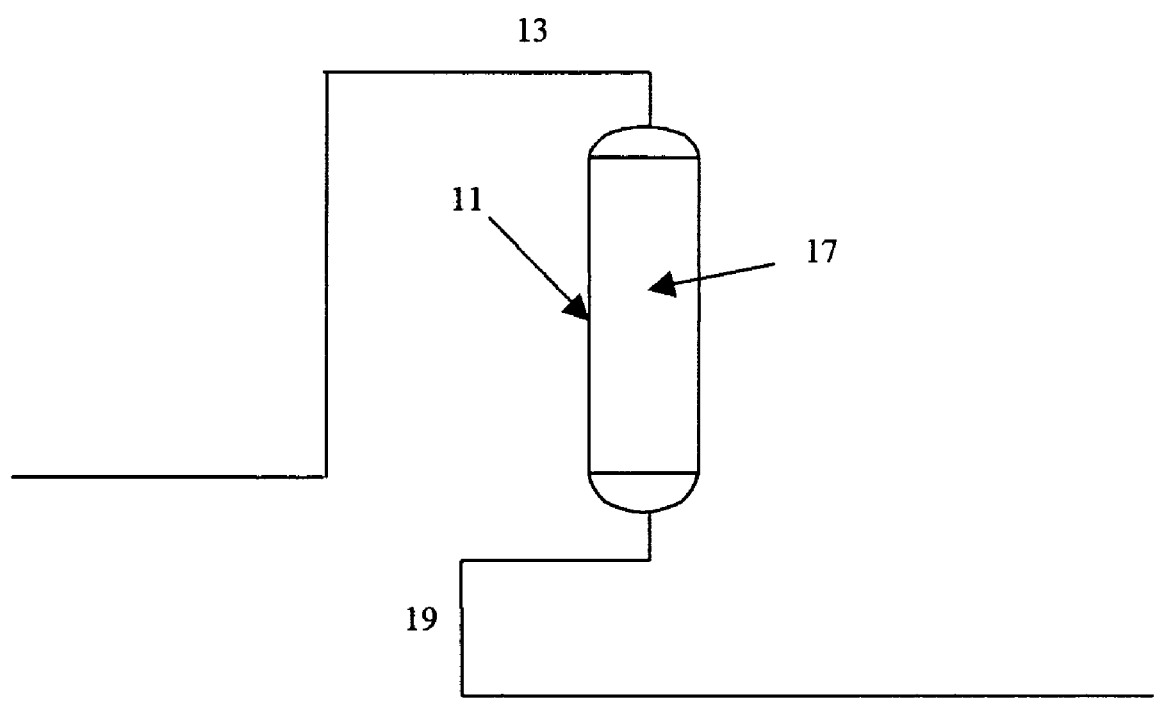
FIG. 3 is a schematic representation of an embodiment of the systems and processes described herein incorporating a single vessel incorporating a single layer of a mixture of a hydrolysis catalyst and sorbent material.

FIG. 3 depicts another embodiment of systems and processes described here. In this embodiment, the systems and processes incorporate a single vessel 11 to which a hydrocarbon stream 13 containing a first sulfur compound is directed. The vessel 11 incorporates a single fixed bed 17 containing a mixture of at least one hydrolysis catalyst and at least one sorbent material. The conditions within the vessel 11 may be within the ranges described in connection with vessels in the embodiments depicted in FIG. 1 and FIG. 2. Moreover, the hydrolysis catalyst and sorbent materials and fixed bed arrangement may be as described in connection with FIG. 1 and FIG. 2. Within the fixed bed 17, the hydrocarbon stream comes into contact with the hydrolysis catalyst in the presence of water as described above to convert the first sulfur compound to $H_2S$. The $H_2S$ is then absorbed onto the sorbent material within the fixed bed 17 to produce a hydrocarbon-containing stream having a reduced sulfur content.

The system and process depicted in FIG. 3 are capable of producing hydrocarbon-containing streams having sulfur contents within the ranges described for the reduced sulfur content streams produced in the embodiments depicted in FIG. 1 and FIG. 2 as long as thorough mixing of the hydrolysis catalyst and sorbent material particles may be achieved.

It is contemplated, in accordance with the all of the systems and processes described herein, that multiple vessels incorporating a hydrolysis catalyst and a sorbent material may be used to treat separate hydrocarbon-containing streams rather than to treat the same hydrocarbon-containing stream sequentially. Moreover, in the various embodiments, any number of vessels having incorporating a hydrolysis catalyst and a sorbent material may be used to treat one or more hydrocarbon-containing stream, regardless of whether the vessels are implemented sequentially or separately.

EXPERIMENTAL EVALUATIONS

The following experimental evaluations of the systems and processes described herein were undertaken. Table I lists four exemplary hydrocarbon-containing streams that were treated in accordance with systems and processes described herein. The content and sulfur compound conversions for each stream during treatment for three hour time periods at various space velocities are provided in Table I. All hydrolysis processes took place by contacting the stream with an activated alumina hydrolysis catalyst commercially available under the designation "DD-431" from Alcoa. Following contact with the hydrolysis catalyst, the streams were contacted with Harshaw ZN-0401 E 3/16 zinc oxide. The hydrolysis catalyst and zinc oxide particles were provided in sequential layers in a single reaction vessel. In total, 17.5 ml of activated alumina and 52.5 ml of ZnO were used in these experiments. The stream contacted the layers at a temperature of 370° C. and pressure of 100 kPa.

TABLE 1

| Time (h) | $N_2$ (volume %) | CH4 (%) | $CO_2$ | $H_2S$ (ppmv) | COS (vppm) | $H_2O$ (vppm) | COS conversion % (#) |
|---|---|---|---|---|---|---|---|
| Example 1 (space velocity = 6000 h$^{-1}$) | | | | | | | |
| Feed | 3.10 | 97.00 | | | 96.8 | 500 | |
| 0.5 | 3.24 | 96.83 | * | 1.0 | 0.12 | * | 99.9 |
| 1.0 | 3.08 | 96.70 | * | 0.8 | 0.11 | * | 99.9 |
| 1.5 | 3.19 | 96.75 | * | 1.0 | 0.19 | * | 99.8 |
| 2.0 | 3.05 | 96.92 | * | 0.8 | 0.11 | * | 99.9 |
| 2.5 | 3.12 | 96.57 | * | 0.9 | 0.11 | * | 99.9 |
| 3.0 | 3.06 | 96.68 | * | 0.8 | 0.13 | * | 99.9 |
| Example 2 (space velocity = 3000 h$^{-1}$) | | | | | | | |
| Feed | 2.98 | 97.88 | | | 109.8 | 500 | |
| 0.5 | 3.03 | 97.17 | * | 0.9 | 0.15 | * | 99.9 |
| 1.0 | 2.97 | 97.81 | * | 0.7 | 0.24 | * | 99.8 |
| 1.5 | 3.02 | 97.22 | * | 0.6 | 0.13 | * | 99.9 |
| 2.0 | 3.04 | 97.68 | * | 0.5 | 0.11 | * | 99.9 |
| 2.5 | 2.97 | 97.23 | * | 0.5 | 0.17 | * | 99.8 |
| 3.0 | 2.88 | 97.08 | * | 0.6 | 0.18 | * | 99.8 |
| Example 3 (space velocity = 6000 h$^{-1}$) | | | | | | | |
| Feed | 3.05 | 97.60 | | | 21.9 | 500 | |
| 0.5 | 3.12 | 96.99 | * | 0.8 | 0.10 | * | 99.5 |
| 1.0 | 3.02 | 97.42 | * | 0.9 | <0.10 | * | >99.5 |
| 1.5 | 2.99 | 97.45 | * | 1.0 | <0.10 | * | >99.5 |
| 2.0 | 3.06 | 97.35 | * | 0.8 | <0.10 | * | >99.5 |
| 2.5 | 3.08 | 97.47 | * | 0.7 | <0.10 | * | >99.5 |
| 3.0 | 3.09 | 98.16 | * | 0.7 | <0.10 | * | >99.5 |
| Example 4 (space velocity = 3000 h$^{-1}$) | | | | | | | |
| Feed | 2.93 | 97.67 | | | 24.3 | 500 | |
| 0.5 | 2.86 | 96.58 | * | 1.5 | 0.15 | * | 99.4 |
| 1.0 | 2.98 | 96.84 | * | 1.2 | <0.10 | * | >99.6 |
| 1.5 | 3.00 | 96.46 | * | 1.5 | 0.14 | * | 99.4 |
| 2.0 | 3.02 | 97.53 | * | 1.5 | 0.11 | * | 99.5 |
| 2.5 | 3.03 | 97.31 | * | 1.4 | 0.11 | * | 99.5 |
| 3.0 | 3.07 | 96.30 | * | 1.3 | <0.10 | * | >99.6 |

* Not measured
(#) Detection limit for PFFD analytic technique of 0.1 ppmv residual COS Review of the results set forth in Table I reveals virtually 100% conversion of COS to $H_2S$ for hydrocarbon-containing streams having COS concentrations of 5000 vppm and 500 vppm at space velocities of 1500 and 3000 hour$^{-1}$.

The systems and processes described herein enable the removal of sulfur compounds from hydrocarbon-containing streams without the need for a separate hydrolysis reactor as typically found in conventional systems. The hydrocarbon-containing streams having reduced sulfur content produced in accordance with the systems and processes described herein are suitable for a variety of uses, including uses as a feed-streams for hydrogen plants, process gas streams for power generation plants, or for other uses for hydrocarbon-containing streams which require reduced sulfur content.

All patents and publications, including priority documents and testing procedures, referred to herein are hereby incorporated by reference in their entireties.

Although the present invention and its advantages have been described in detail, it should be understood that various changes, substitutions, and alterations could be made without departing from the spirit and scope of the invention as defined by the following claims. Moreover, any upper limit recited may be combined with any lower limit for selected subranges.

The invention claimed is:

1. A process for removing at least a portion of a first sulfur compound from a hydrocarbon-containing stream to produce a first stream having a reduced content of the first sulfur compound comprising (i) contacting the hydrocarbon-containing stream with a catalyst selected from the group consisting of alumina, titania, titanium dioxide, and mixtures thereof, in a first vessel, in the presence of sufficient water to have a molar ratio of water to first sulfur compound of about 1:1 to about 1000:1, to convert at least a portion of the first sulfur compound to a second sulfur compound; and (ii) contacting the hydrocarbon-containing stream containing the second sulfur compound with a sorbent material selected from the group consisting of zinc oxide, copper oxide, hydroxides, carbonates, hydroxycarbonates, and mixtures thereof, in the first vessel, to remove at least a portion of the second sulfur compound from the hydrocarbon-containing stream to produce the first stream having a reduced content of the first sulfur compound.

2. The process of claim 1 wherein the hydrocarbon-containing stream is contacted with the catalyst at a temperature of about 300° to 450° C. and a pressure of about 100 kPa to about 5,000 kPa.

3. The process of claim 2 wherein the hydrocarbon-containing stream is contacted with the hydrolysis catalyst in a first zone of the first vessel and the hydrocarbon-containing stream is contacted with the sorbent material in a second zone of the first vessel.

4. The process of claim 3 wherein the first stream comprising the second sulfur compound is contacted with the sorbent material at a temperature of about 300° C. to 450° C. and a pressure of about 100 kPa to about 5,000 kPa.

5. The process of claim 4 wherein the hydrolysis catalyst comprises activated alumina and the sorbent material comprises zinc oxide.

6. The process of claim 5 wherein the first sulfur compound is selected from the group consisting of carbonyl sulfide, carbon disulfide, and mixtures thereof.

7. The process of claim 6 wherein the carbonyl sulfide is present in the hydrocarbon-containing stream at a concentration of about 5 vppm to about 1,000 vppm and water is present in the hydrocarbon-containing stream at molar ratio of water to carbonyl sulfide of about 1:1 to about 100:1.

8. The process of claim 7 wherein the first stream having a reduced content of the first sulfur compound has a carbonyl sulfide content of less than 0.1 vppm.

9. The process of claim 7 wherein the first stream having a reduced content of the first sulfur compound is directed to a second vessel and contacted with a catalyst selected from the group consisting of alumina, titania, titanium dioxide, and mixtures thereof, to produce a second stream comprising the second sulfur compound and directing the second stream comprising the second sulfur compound to a sorbent material selected from the group consisting of zinc oxide, copper oxide, hydroxides, carbonates, hydroxycarbonates, and mixtures thereof, to produce a second stream having a reduced content of the first sulfur compound.

10. The process of claim 9 wherein the first stream having a reduced content of the first sulfur compound is contacted with the catalyst at a temperature of about 300° C. to 450° C. and a pressure of about 100 kPa to about 5,000 kPa.

11. The process of claim 10 wherein the hydrolysis catalyst comprises activated alumina and the sorbent material comprises zinc oxide.

12. The process of claim 11 wherein the second stream having a reduced content of the first sulfur compound has a total sulfur content of less than 0.1 vppm.

13. A process for generating hydrogen comprising:
(i) contacting a hydrocarbon-containing stream comprising a first sulfur compound with a hydrolysis catalyst selected from the group consisting of alumina, titania, titanium dioxide, and mixtures thereof, in a first vessel, in the presence of sufficient water to have a molar ratio of water to first sulfur compound of about 1:1 to about 1000:1, to convert at least a portion of the first sulfur compound to a second sulfur compound;
(ii) contacting at least a portion of the second sulfur compound with a sorbent material selected from the group consisting of zinc oxide, copper oxide, hydroxides, carbonates, hydroxycarbonates, and mixtures thereof, in the first vessel, to absorb at least a portion of the second sulfur compound to produce the first stream having a reduced content of the first sulfur compound; and
(iii) directing the first stream having a reduced content of the first sulfur compound to a reformer to reform the first stream having a reduced content of the first sulfur compound in the presence of steam to produce a hydrogen-containing stream.

14. A process for removing at least a portion of a first sulfur compound from a hydrocarbon-containing stream to produce a first stream having a reduced content of the first sulfur compound comprising:
(i) contacting the hydrocarbon-containing stream with a catalyst selected from the group consisting of alumina, titania, titanium dioxide, and mixtures thereof, in a first vessel, at a temperature of from about 300° C. to about 450° C. in the presence of sufficient water to have a molar ratio of water to first sulfur compound of about 1:1 to about 1000:1, to convert at least a portion of the first sulfur compound to a second sulfur compound; and
(ii) contacting the hydrocarbon-containing stream containing the second sulfur compound with a sorbent material, different from the catalyst of step (i), selected from the group consisting of zinc oxide, copper oxide, hydroxides, carbonates, hydroxycarbonates, and mixtures thereof, in the first vessel, to remove at least a portion of the second sulfur compound from the hydrocarbon-containing stream to produce the first stream having a reduced content of the first sulfur compound.

* * * * *